US008953068B2

(12) United States Patent
Ohta

(10) Patent No.: US 8,953,068 B2
(45) Date of Patent: Feb. 10, 2015

(54) IMAGING DEVICE

(75) Inventor: Atsuya Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/980,879

(22) Filed: Dec. 29, 2010

(65) Prior Publication Data

US 2011/0234862 A1   Sep. 29, 2011

Related U.S. Application Data

(63) Continuation of application No. PCT/JP2009/061225, filed on Jun. 19, 2009.

(30) Foreign Application Priority Data

Jul. 3, 2008  (JP) .................................. 2008-174737

(51) Int. Cl.
| | | |
|---|---|---|
| H04N 9/64 | (2006.01) | |
| H04N 5/365 | (2011.01) | |
| H04N 5/343 | (2011.01) | |
| H04N 5/345 | (2011.01) | |
| H04N 5/361 | (2011.01) | |

(52) U.S. Cl.
CPC ............. H04N 5/3658 (2013.01); H04N 5/343 (2013.01); H04N 5/3456 (2013.01); H04N 5/361 (2013.01)
USPC ....................................................... 348/246

(58) Field of Classification Search
CPC ..... H04N 5/238; H04N 5/2351; H04N 5/367; H04N 9/045
USPC ......................................................... 348/246
See application file for complete search history.

(56) References Cited

U.S. PATENT DOCUMENTS

| | | | | |
|---|---|---|---|---|
| 6,084,634 | A  * | 7/2000 | Inagaki et al. ................ | 348/294 |
| 7,317,481 | B2 | 1/2008 | Harada et al. | |
| 8,203,629 | B2 * | 6/2012 | Nagata .......................... | 348/241 |
| 8,379,118 | B2 * | 2/2013 | Komori ......................... | 348/241 |

(Continued)

FOREIGN PATENT DOCUMENTS

| | | |
|---|---|---|
| JP | A-6-54262 | 2/1994 |
| JP | A-10-126697 | 5/1998 |

(Continued)

OTHER PUBLICATIONS

International Search Report dated Sep. 1, 2009 in corresponding International Application No. PCT/JP2009/061225.

(Continued)

*Primary Examiner* — Twyler Haskins
*Assistant Examiner* — Fayez Bhuiyan
(74) *Attorney, Agent, or Firm* — Oliff PLC

(57) ABSTRACT

An imaging device includes: an image sensor that outputs pixel signals by capturing a subject image, the image sensor including a plurality of pixels disposed in a matrix pattern and; a calculation unit that calculates correction values each used to individually correct errors in pixel signals read out from one of pixel columns at the image sensor, while the image sensor in a continuous shooting state continuously outputs the pixel signals; and a correction unit that corrects the pixel signals by using the correction values calculated in the continuous shooting state, wherein: if a specific condition changes in the continuous shooting state, the correction unit corrects the pixel signals by using the correction values already in use.

8 Claims, 11 Drawing Sheets

(56) References Cited

U.S. PATENT DOCUMENTS

| | | | |
|---|---|---|---|
| 2004/0165101 A1* | 8/2004 | Miyanari et al. | 348/363 |
| 2005/0237422 A1* | 10/2005 | Kido | 348/362 |
| 2005/0253935 A1* | 11/2005 | Hiramatsu et al. | 348/222.1 |
| 2008/0074514 A1* | 3/2008 | Harada et al. | 348/243 |
| 2008/0100728 A1* | 5/2008 | Nagata | 348/247 |
| 2009/0278962 A1* | 11/2009 | Richardson et al. | 348/241 |

FOREIGN PATENT DOCUMENTS

| | | |
|---|---|---|
| JP | A-H11-261952 | 9/1999 |
| JP | A-2000-152097 | 5/2000 |
| JP | A-2003-244513 | 8/2003 |
| JP | A-2005-51697 | 2/2005 |
| JP | A-2007-96607 | 4/2007 |
| JP | A-2008-28757 | 2/2008 |
| JP | A-2008-92282 | 4/2008 |

OTHER PUBLICATIONS

Nov. 13, 2012 Office Action issued in Japanese Patent Application No. 2010-518992 (with translation).

May 21, 2013 Office Action issued in Japanese Patent Application No. 2010-518992 (with translation).

* cited by examiner

IMAGING DEVICE

This application is a continuation of International Application No. PCT/JP 2009/061225 filed Jun. 19, 2009

INCORPORATION BY REFERENCE

The disclosures of the following priority applications are herein Incorporated by reference:
Japanese Patent Application No. 2008-174737 filed Jun. 19, 2008
International Application No. PCT/JP 2009/061225 filed Jun. 19, 2009

BACKGROUND OF THE INVENTION

1. Field of the Invention

The present invention relates to an imaging device that corrects noise contained in pixel signals provided by an image sensor.

2. Description of Related Art

Japanese Laid Open Patent Publication No. H10-126697 discloses a camera that corrects fixed pattern noise (FPN) originating from an X-Y address-type solid-state image sensor.

SUMMARY OF THE INVENTION

There is still an issue to be addressed in the camera in that during a pixel signal read at the time of a pixel reset, FPN is corrected by subtracting a correction value from pixel signals obtained through movie shooting, and thus, the frame rate of the movie will be lowered.

According to the 1st aspect of the present invention, an imaging device comprises: an image sensor that outputs pixel signals by capturing a subject image, the image sensor including a plurality of pixels disposed in a matrix pattern and; a calculation unit that calculates correction values each used to individually correct errors in pixel signals read out from one of pixel columns at the image sensor, while the image sensor in a continuous shooting state continuously outputs the pixel signals; and a correction unit that corrects the pixel signals by using the correction values calculated in the continuous shooting state, wherein: if a specific condition changes in the continuous shooting state, the correction unit corrects the pixel signals by using the correction values already in use.

According to the 2nd aspect of the present invention, after the specific condition changes, the correction unit of an imaging device according to the 1st aspect may correct the pixel signals output from the image sensor by using most recently used correction values among correction values having already been used in the continuous shooting state.

According to the 3rd aspect of the present invention, it is preferred that an imaging device according to theist aspect further comprises: a capacity detection unit that detects a change in remaining power in a battery to a level less than a predetermined threshold value, wherein: the change occurring in the specific condition is the change in the remaining capacity of the battery to a level less than the predetermined threshold value, the remaining capacity being detected by the capacity detection unit.

According to the 4th aspect of the present invention, it is preferred that an imaging device according to the 1st aspect further comprises: a temperature detection unit that detects a change in a temperature near the image sensor to a level equal to or above a predetermined threshold value, wherein: the change occurring in the specific condition is the change in the temperature to a level equal to or above the predetermined threshold value, the temperature being detected by the temperature detection unit.

According to the 5th aspect of the present invention, it is preferred that an imaging device according to the 1st aspect further comprises: a first instruction member that outputs a shooting instruction signal providing an instruction for a shooting start so as to sequentially record still images into a recording medium, the still images being constituted with image data corresponding to the pixel signals output from the image sensor in response to the shooting instruction signal, wherein: the continuous shooting state includes an operating state in a continuous shooting mode, in which still image shooting and recording of the image data into the recording medium are alternately repeated continuously while the shooting instruction signal is input.

According to the 6th aspect of the present invention, it is preferred that an imaging device according to theist aspect further comprises: a display unit at which an image corresponding to the pixel signals output from the image sensor is displayed, wherein: the continuous shooting state includes an operating state in a live view mode in which the image is displayed at the display unit without recording image data corresponding to the image signals into a recording medium.

According to the 7th aspect of the present invention, it is preferred that an imaging device according to the 6th aspect further comprises: a second instruction member that issues an instruction for entering a movie shooting mode in which image data corresponding to the pixel signals continuously output from the image sensor are recorded into the recording medium as a movie image, wherein: the change in the specific condition is a changeover achieved via the second instruction member from the continuous shooting state to the movie shooting mode.

According to the 8th aspect of the present invention, it is preferred that an imaging device according to the 6th aspect further comprises: a sensitivity setting member that sets an imaging sensitivity level at the image sensor, wherein: if the imaging sensitivity level is altered while the correction unit corrects the pixel signals by using previously used correction values, the calculation unit calculates new correction values each to be used to individually correct errors in the pixel signals in correspondence to one of the pixel columns; and the correction unit corrects the pixel signals by using the new correction values instead of the previously used correction values.

According to the present invention, when a specific condition is satisfied, FPN correction can be achieved by using a correction value already in use.

DESCRIPTION OF PREFERRED EMBODIMENTS

First Embodiment

Figure 1:
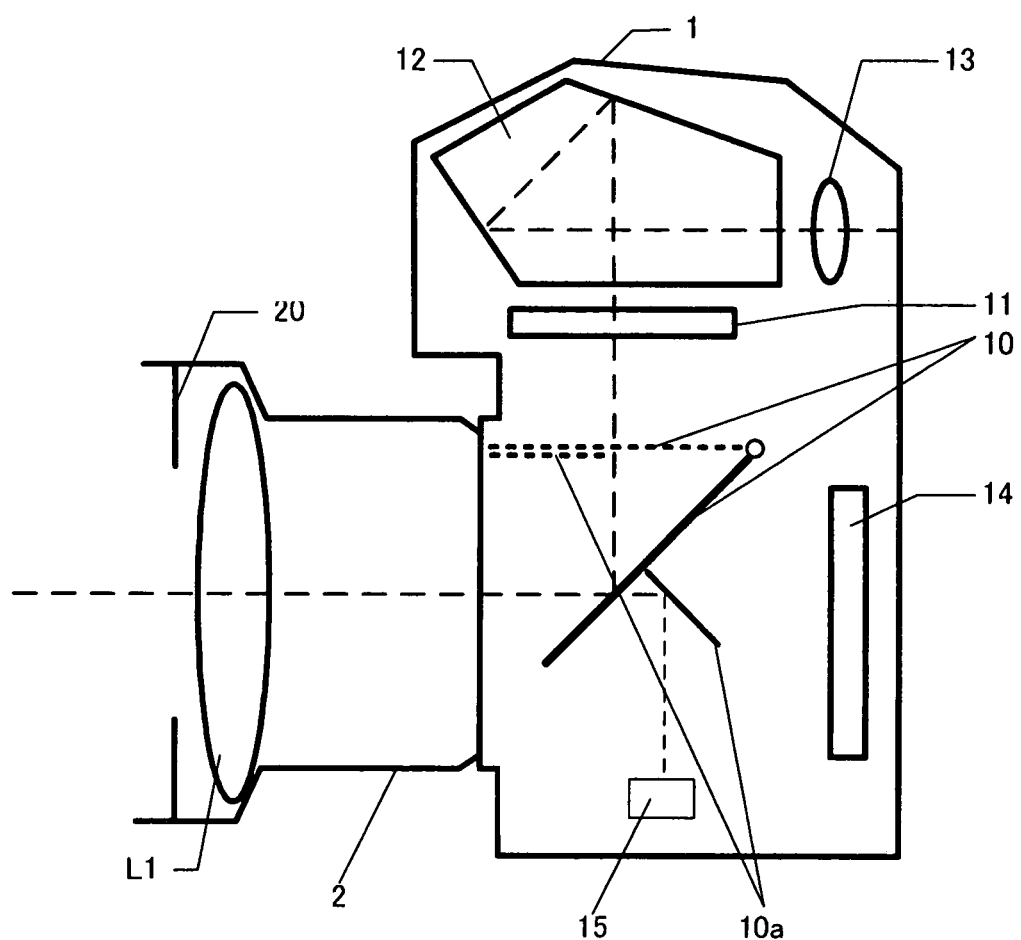
FIG. 1 shows the essential structure of the electronic camera achieved in an embodiment of the present invention.

In reference to drawings, the camera achieved in the first embodiment of the present invention is described. FIG. 1 shows the essential structure of an electronic camera 1. An interchangeable lens 2, which includes a photographic lens L1 and an aperture 20, is detachably mounted at the body of the electronic camera 1. At the body of the camera 1, a quick return mirror 10, a focusing screen 11, a pentaprism 12, an eyepiece lens 13, an image sensor 14 and a focus detection sensor 15 are disposed.

Figure 2:
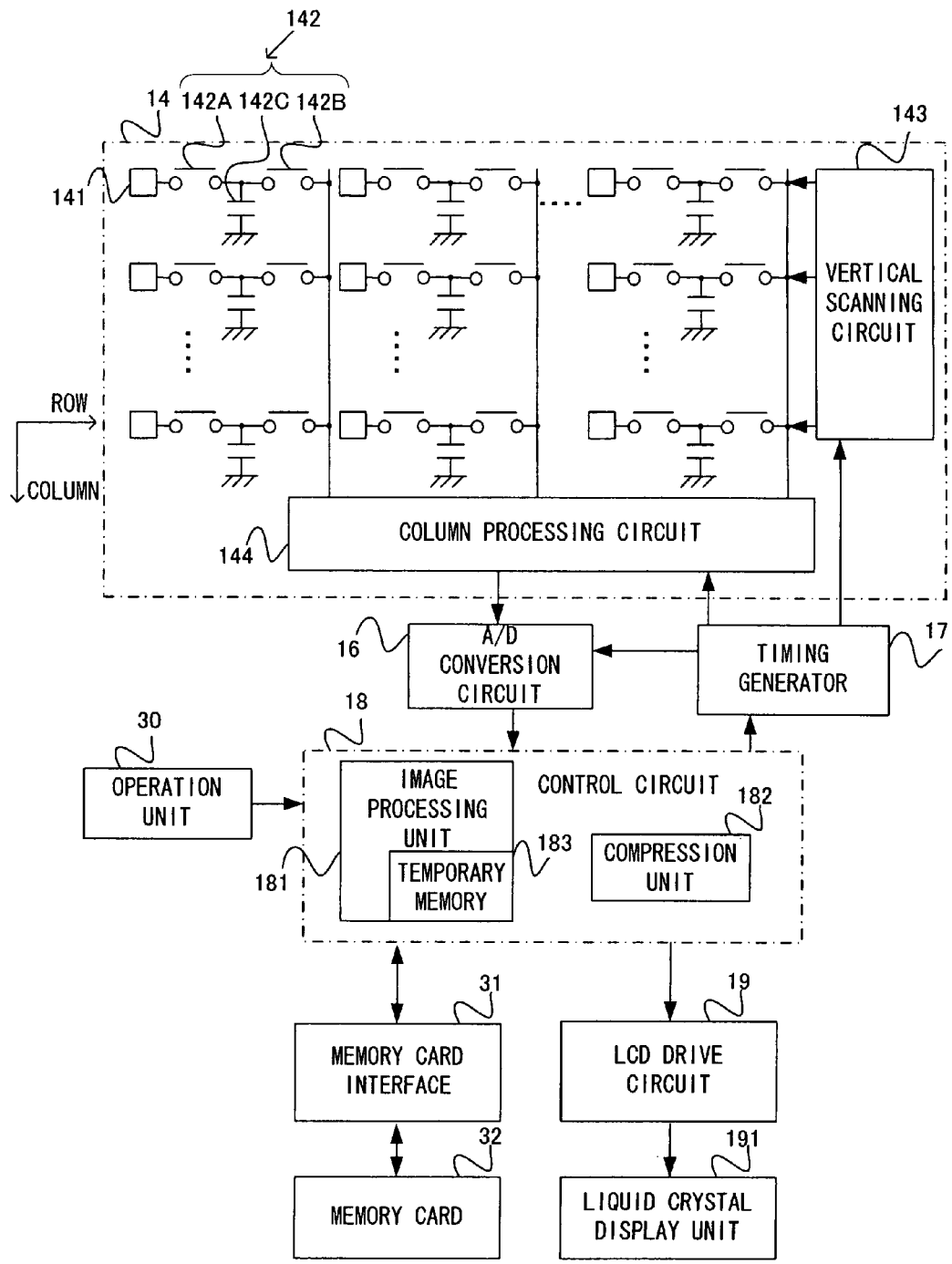
FIG. 2 is a block diagram showing the structure of the control system in the electronic camera achieved in a first embodiment.

FIG. 2 is a block diagram of the control system in the electronic camera 1. In FIG. 2, the same reference numerals are assigned to components shown in FIG. 1. The control system of the electronic camera 1 includes the image sensor 14, an A/D conversion circuit 16, a timing generator 17, a control circuit 18, an LCD drive circuit 19, a liquid crystal display unit 191, an operation unit 30 and a memory card interface 31.

As shown in FIG. 1, subject light having entered the electronic camera 1 after passing through the interchangeable lens 2, is guided upward via the quick return mirror 10 assuming the position indicated by the solid line in FIG. 1 prior to a shutter release and forms an image at the focusing screen 11. The subject image formed on the focusing screen 11 is then guided to the eyepiece lens 13 via the pentaprism 12. The photographer is thus able to view the subject image. Part of the subject light is transmitted through a semi-transmissive area of the quick return mirror 10, is reflected downward at a sub mirror 10a and enters the focus detection sensor 15. Following a shutter release, the quick return mirror 10 swings to the position indicated by the dotted line in FIG. 1, thereby allowing the subject light to be guided to the image sensor 14 and thus, a subject image is formed on the imaging plane of the image sensor 14.

In reference to FIG. 2, the control system is described in detail.

The image sensor 14 is an X-Y address-type photoelectric conversion element that includes numerous pixel photodiodes 141 disposed in a matrix array, switches 142 each disposed at one of the pixel photodiodes 141, a vertical scanning circuit 143 via which rows of pixel photodiodes 141 are sequentially selected, and a column processing circuit 144. The switches 142 each include a transfer gate switch 142A (hereafter referred to as a switch 142A), a pixel selector switch 142B (hereafter referred to as a switch 142B) and a capacitor 142C.

Via the switch 142A, disposed between the pixel photodiode 141 and the capacitor 142C, the electrical connection between the pixel photodiode 141 and the capacitor 142C is switched on/off. An electrical charge resulting from photoelectric conversion executed at the pixel photodiode 141 is converted to a voltage value at the capacitor 142C. Via the switch 142B, disposed between the capacitor 142C and the column processing circuit 144, the electrical connection between the capacitor 142C and the column processing circuit 144 is switched on/off. While the switches 142A and 142B in a given pixel are both in the ON state, light received at the particular pixel undergoes photoelectric conversion and the signal resulting from the photoelectric conversion is transmitted to the column processing circuit 144.

If, on the other hand, the switch 142A is in the OFF state and the switch 142B is in the ON state at the pixel, a signal equivalent to a signal generated when the pixel photodiode 141 and the column processing circuit 144 are disconnected from each other, i.e., a signal generated when no light is received at the pixel (an element of FPN to be detailed later) is transmitted to the column processing circuit 144. The pixel photodiode 141 converts the received subject light to a pixel signal corresponding to the intensity of the received light and outputs the pixel signal to the A/D conversion circuit 16 via the switch 142 (the switch 142A and the switch 142B) and the column processing circuit 144.

The image sensor 14 adopts a structure that allows the imaging sensitivity (exposure sensitivity) to be adjusted over predetermined steps within a range approximately equivalent to, for instance, ISO 100~ISO 1600. The term "imaging sensitivity" is used in this document to refer to the sensitivity with which electrical charges stored in the image sensor 14 are detected or the extent to which amplification gain at an amplifier circuit (not shown) is to be altered.

Pixel signals output from the pixel photodiodes 141 in a specific row selected by the vertical scanning circuit 143 (the switch 142A is turned off and the switch 142B is turned on at each pixel in the selected row) are input to the column processing circuit 144, which includes a set of a CDS circuit, a line memory and the like, disposed in correspondence to each column of pixel photodiodes 141. In this situation, at least the switches 142B in the individual pixel photodiodes 141 in the rows that are not currently selected are all in the OFF state.

Pixel signals obtained when the switches 142A are in the OFF state and the switches 142B are in the ON state at the individual pixels in the selected row are held at the column processing circuit 144 as offset signals in correspondence to the individual columns. The switches 142A and 142B are turned on and off substantially simultaneously at all the selected pixels. The offset signals thus obtained constitute streaky fixed pattern noise (hereafter referred to as FPN) originating at the column processing circuit 144 and manifesting along the vertical direction in the photographic image, i.e., fixed pattern noise (FPN) manifesting along the individual columns at the image sensor 14.

The control circuit 18, to be described in detail later, calculates a correction value (FPN correction value) by using the FPN determined as described above and executes FPN correction on an image signal by using the calculated FPN correction value. In addition, the FPN correction value having been calculated is stored into a temporary memory 183 installed in an image processing unit 181, which is to be described in detail later.

It is to be noted that, in the method described above, while the FPN is obtained as pixel signals from the pixel photodiodes 141 in a specific row (selected row) by sustaining all the pixel switches 142A in the OFF state and sustaining all the switches 142B in the ON state in the selected row, the FPN may be obtained through an alternative method such as that described below. Namely, the FPN may be obtained by setting the switches 142A in the pixels in all the rows (i.e., all the pixels) in the OFF state and setting the pixel switches 142B in the specific row (selected row) alone in the ON state.

The A/D conversion circuit 16 executes analog processing on the pixel signals output from the image sensor 14 and then converts the processed pixel signals to digital image data. The timing generator 17 is a circuit that controls the timing with which the image sensor 14 and the A/D conversion circuit 16 are driven by outputting timing signals to the image sensor 14 and the A/D conversion circuit 16 in response to instructions issued by the control circuit 18.

The control circuit 18, which includes a CPU, a ROM and a RAM (none shown), is an arithmetic operation circuit that controls the various components constituting the electronic camera 1 and executes various types of data processing. The timing generator 17 mentioned earlier is controlled by the control circuit 18.

The control circuit 18 includes the image processing unit 181 and a compression unit 182. The image processing unit 181 executes image processing such as white balance processing, gamma correction processing, color interpolation processing, edge enhancement processing and vignetting correction processing on image data input thereto. In addition, the image processing unit 181 executes electronic zoom processing through image processing on image data input thereto so as to adjust the magnification factor for the image in correspondence to a magnification factor selected via the operation unit 30 to be detailed later. The compression unit 182 is a circuit that executes JPEG compression processing on image data generated through the image processing executed at the image processing unit 181.

The memory card interface 31 is an interface at which a memory card 32 can be detachably loaded. Under control executed by the control circuit 18, image data are written into the memory card 32 or image data recorded in the memory card 32 are read out at the memory card interface 31. The memory card 32 is a semiconductor memory card such as a compact flash (registered trademark) or an SD card.

The LCD drive circuit 19 drives the liquid crystal display unit 191 based upon an instruction provided by the control circuit 18. In a reproduce mode, display data created by the control circuit 18 based upon image data recorded in the memory card 32 are brought up on display at the liquid crystal display unit 191. In addition, a "live view" image can be displayed at the liquid crystal display unit 191. The term "live view" is used to refer to a display mode in which a pre-shutter release image captured via the image sensor 14 with the quick return mirror 10 swung upward, is displayed in real-time at the liquid crystal display unit 191. The live view mode is an imaging mode available in a single lens reflex camera.

The operation unit 30 is constituted with switches via which user operations are entered. The operation unit 30 includes a power switch, a shutter release switch, a zoom switch via which the photographic image magnification factor is adjusted, a display changeover switch operated to bring up on display another setting menu, a setting menu confirm button, a sensitivity setting switch operated to alter the imaging sensitivity setting at the image sensor 14 explained earlier, and the like. In addition, either a still image shooting mode or a movie shooting mode can be selected as a shooting mode via the operation unit 30, and the live view mode can be set via the operation unit 30 to display the live view image described earlier. Accordingly, the camera set in the still image shooting mode and the live view mode commences still image shooting as the user presses the shutter release button all the way down while the live view image is on display, whereas the camera set in the movie shooting mode and the live view mode commences movie shooting as the user presses the shutter release switch all the way down while the live view image display is up.

—Still Image Shooting Mode—

As the still image shooting mode is selected in response to a user operation at the operation unit 30 and a shooting instruction is issued in response to a full press operation of the shutter release switch, the control circuit 18 swings the quick return mirror 10 to the position indicated by the dotted line in FIG. 1 so as to allow subject light having passed through the photographic lens L1 to be guided to the image sensor 14. The control circuit 18 also issues an instruction for the timing generator 17 to turn off switches 142A and turn on switches 142B via the vertical scanning circuit 143 so that signals are output from the pixel photodiodes 141 corresponding to pixels accounting for, for instance, one third of the overall area where all the pixels constituting the image sensor 14 are present.

Figure 3:
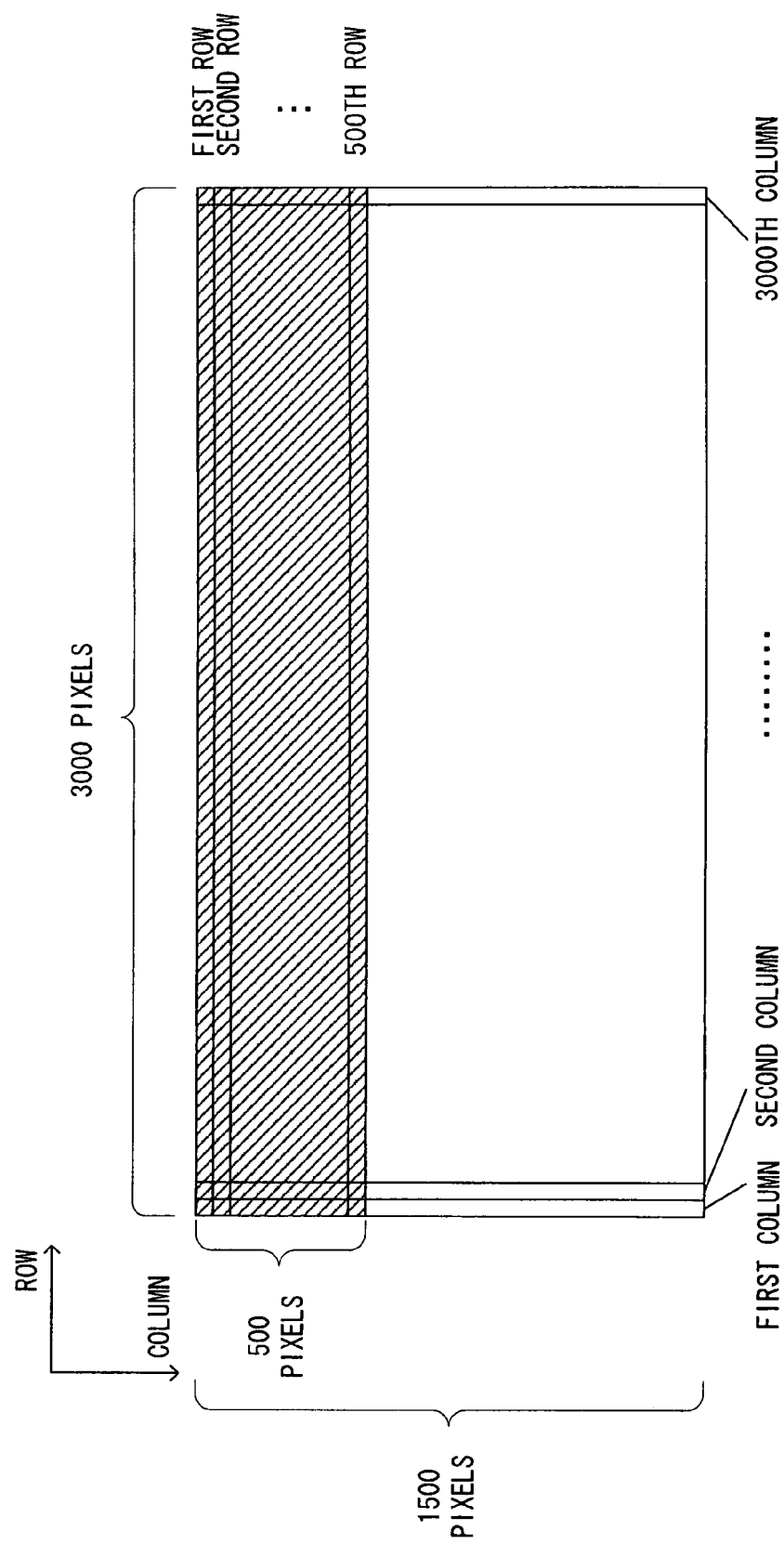
FIG. 3 presents an example of a pixel area from which pixel signals may be read out in a still image shooting mode.

The shaded area in FIG. 3 indicates a pixel area from which pixel signals (correction value signals) to be used for purposes of FPN correction value calculation may be read out. It is to be noted that the following explanation is given by assuming that the image sensor 14 is constituted with 3000× 1500 pixels to simplify the description. In addition, the description is given in reference to FIGS. 3 through 6 by assuming that the pixel rows extend along the horizontal direction in the figures and that the pixel columns extend along the vertical direction in the figures. In the embodiment, pixel signals output from the pixel range (3000×500) present in an area equivalent to one third of the entire pixel range, located on the uppermost side of the pixel range, are read out in correspondence to the 3000 individual columns. Namely, the vertical scanning circuit 143 turns off the switches 142A and turns on the switches 142B in the first through 500th rows designates as selected rows. It is to be noted that pixel rows present over predetermined intervals (e.g., every third pixel row) may be designated as selected rows. Consequently, pixel signals (FPN), to be used as correction signals, are read out from 500 pixel photodiodes 141 in each column among the first through 3000th columns at the image sensor 14, and the pixel signals thus read out are input to the column processing circuit 144.

The column processing circuit 144 outputs the pixel signals in all the columns, i.e., from 3000 columns, to the control circuit 18 via the A/D conversion circuit 16. The image processing unit 181 calculates an FPN correction value in correspondence to each of the 3000 columns by averaging the correction signals (from the 500 pixels) from the particular column, among the correction signals from the 3000 columns having been input as described above, and stores the calculated FPN correction values into the temporary memory 183.

Next, the control circuit 18 issues a command for the timing generator 17 to turn on all the switches 142A and 142B so that pixel signals output from all the pixels at the image sensor 14 are input to the image processing unit 181 as main image signals. The image processing unit 181 subtracts the FPN correction value calculated in correspondence to the first column from the first-column main image signals having been input. The image processing unit 181 executes FPN correction processing by subtracting the FPN correction value calculated for each column from the main image signals originating from the corresponding column. The main image signals having undergone the FPN correction processing further undergo the image processing and the compression processing described earlier at the control circuit 18 and are finally recorded as still image data into the memory card 32. It is to be noted that the FPN correction processing executed as the operation shifts from live view image display to still image shooting will be described in detail later.

—Movie Shooting—

Figure 4A:
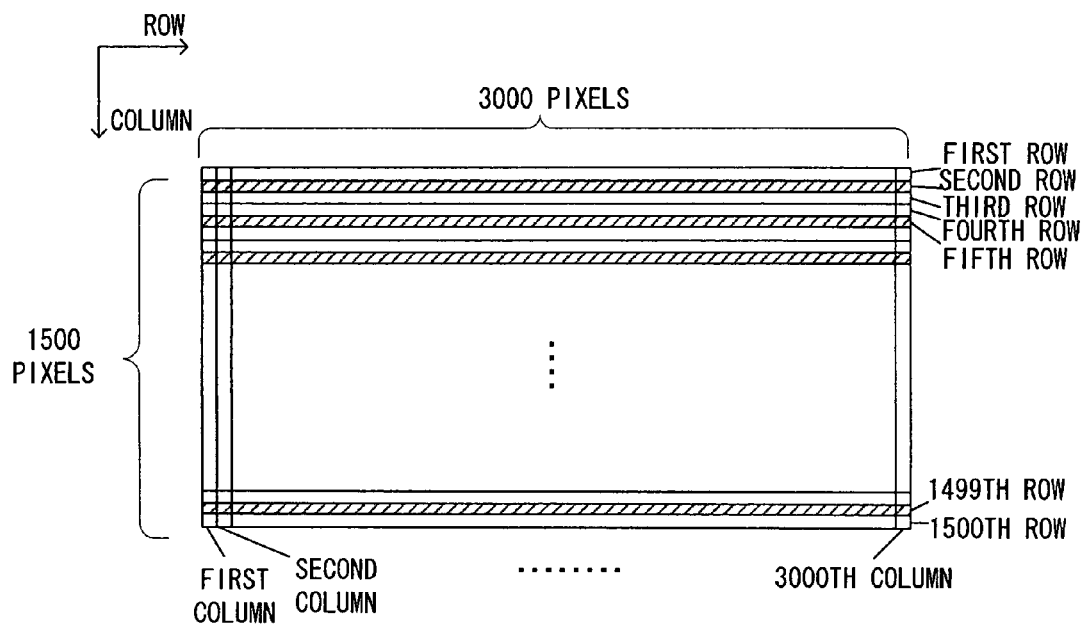
FIGS. 4A and 4B each show a pixel area from which pixel signals may be read out in a movie shooting mode, with FIG. 4A presenting an example of a pixel area from which main image signals may be read out in the movie shooting mode and FIG. 4B presenting an example of a pixel area from which correction signals may be read out in the movie shooting mode.

As the movie shooting mode is selected via the operation unit 30 and a shooting instruction is issued in response to a full press operation of the shutter release switch, the control circuit 18 swings the quick return mirror 10 to the position indicated by the dotted line in FIG. 1 and starts a movie shooting operation. FIG. 4A indicates pixel rows from which pixel signals may be read out through a reduced read during the movie shooting operation. FIG. 4A indicates that the control circuit 18 executes control in the movie shooting mode so as to read out main image signals from the pixel photodiodes 141 in every third pixel row, accounting for one third (500 rows) among adjacent pixel rows along the vertical direction (⅓ reduced read), instead of reading out the main image signals from all the pixels constituting the image sensor 14. The control circuit 18 then generates movie image data expressing a main image by using the main image signals having been read out through the ⅓ reduced read.

Prior to the main image signal read, the control circuit 18 reads out correction signals to be used for FPN correction value calculation. Assuming that the main image signals are read out through the ⅓ reduced read (from 500 rows), the control circuit 18 executes control so as to output correction signals from the pixel photodiodes 141 present in pixel rows accounting for, for instance, one third of the number of pixel rows from which the main image signals are to be read out by reducing pixel rows along the vertical direction. For these purposes, the control circuit 18 issues an instruction for the timing generator 17 to turn off the corresponding switches 142A and turn on the corresponding switches 142B via the vertical scanning circuit 143 so that correction signals are output from the pixel photodiodes 141 present in 500/3 (166) pixel rows.

Figure 4B:
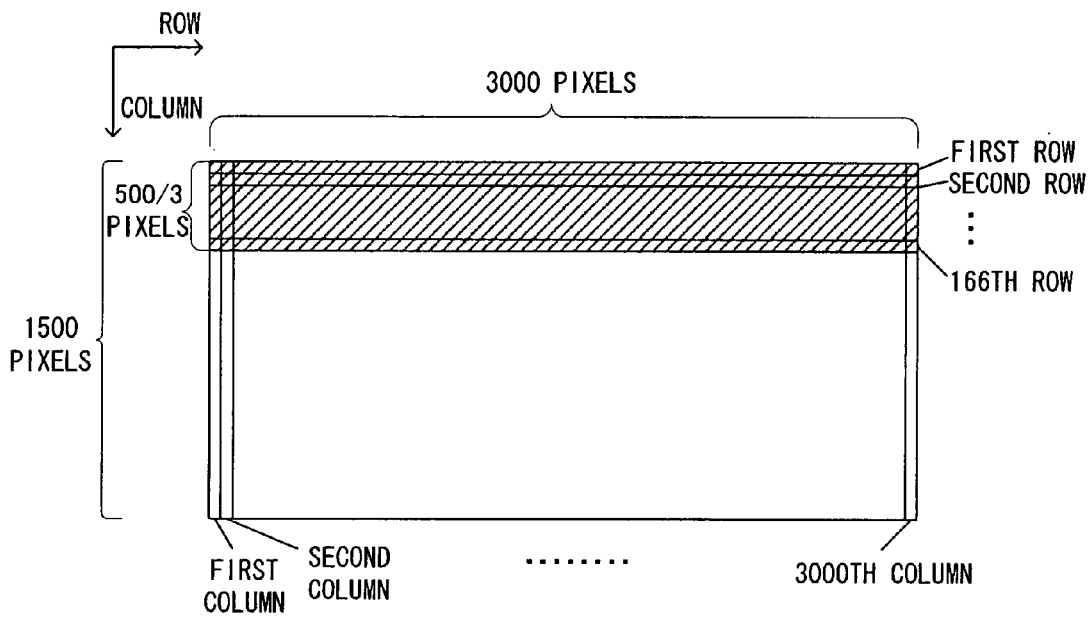

FIG. 4B shows the pixel rows from which correction signals are read out through the reduced read during the movie shooting operation in order to obtain correction signals. The pixel rows with the pixels from which correction signals are read out are present in the shaded area. Namely, the vertical scanning circuit 143 turns off the switches 142A and turns on the switches 142B in the first through 166th pixel rows designated as selected rows. It is to be noted that pixel rows present over predetermined intervals (e.g., every third pixel row) may be designated as selected rows. Consequently, correction signals (FPN) are read out from a total of 166 pixel photodiodes 141 in through first column at the image sensor 14, and the correction signals thus read out are input to the column processing circuit 144. The column processing circuit 144 outputs the correction signals (FPN) originating from all the columns, i.e., from the 3000 columns, to the control circuit 18 via the A/D conversion circuit 16.

The control circuit 18 calculates an FPN correction value in correspondence to each of the 3000 columns by averaging the correction signals from the particular column, among the correction signals from the 3000 columns having been input as described above, and stores the calculated FPN correction values into the temporary memory 183.

The pixel rows with pixels from which the main image signals may be read out during the movie shooting operation are shaded in FIG. 4A. Namely, the vertical scanning circuit 143 turns on the switches 142A and 142B in the second pixel row, the fifth pixel row, . . . and the 3(n−1)th row (n is a natural number: n≤500) designated as the selected rows. As a result, main image signals are read out from a total of 500 pixel photodiodes 141 in the first column of the image sensor 14, and the main image signals thus read out are input to the column processing circuit 144. In other words, the main image signals are read out from a total of 500 pixel photodiodes 141 in the pixel rows selected over two-pixel row intervals, all belonging to the first column of the image sensor 14, and the main image signals thus read out are input to the column processing circuit 144. The column processing circuit 144 outputs the main image signals in all the columns, i.e., from the 3000 columns, to the control circuit 18 via the A/D conversion circuit 16.

When obtaining an image in the first frame, the image processing unit 181 calculates an FPN correction value for each column by averaging the correction signals from the particular column among the correction signals originating from the 3000 columns input as described earlier, and stores the FPN correction values thus calculated into the temporary memory 183. The image processing unit 181 then subtracts the FPN correction value calculated in correspondence to the first column from the main image signals originating from the first column. The image processing unit 181 executes FPN correction processing by subtracting the FPN correction value calculated for each column from the main image signals originating from the corresponding column among the 3000 columns. For the image in each subsequent frame, the image processing unit 181 executes FPN correction on the corresponding main image signals by using the FPN correction values having been calculated as explained above. The main image signals having undergone the FPN correction processing further undergo the image processing and the compression processing described earlier at the control circuit 18 and are finally recorded as movie image data into the memory card 32. The control circuit 18 also displays a movie image corresponding to the movie image data thus obtained at the liquid crystal display unit 191. It is to be noted that the FPN correction processing executed as the operation shifts from live view image display to movie shooting, will be described in detail later.

—Live View Mode—

As the live view mode is selected in response to a user operation at the operation unit 30, the control circuit 18 swings the quick return mirror 10 to the position indicated by the dotted line in FIG. 1 so as to allow subject light having passed through the photographic lens L1 to be guided to the image sensor 14. The control circuit 18 also selects pixel rows containing pixels from which pixel signals are to be read out, among all the pixels constituting the image sensor 14, in correspondence to whether or not the magnification factor has been altered through a user operation at the operation unit 30. The processing executed when a magnified display setting has been selected (hereafter referred to as "when the magnification factor has been altered") and the processing executed when a 1:1 magnification display setting has been selected (hereafter referred to as "when the magnification factor has not been altered") are individually explained below.

—When the Magnification Factor has not been Altered—

Figure 5A:
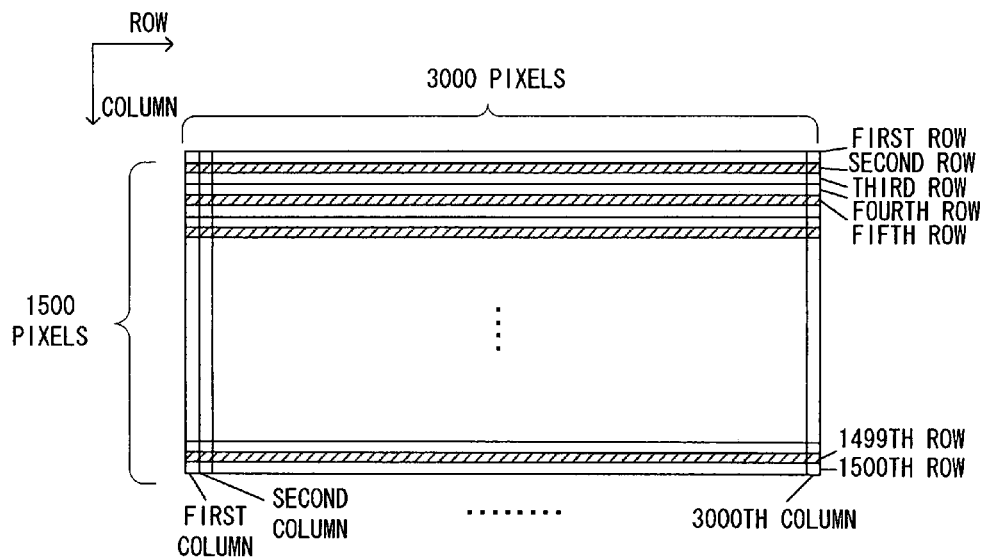
FIGS. 5A and 5B each show a pixel area from which pixel signals may be read out in a live view mode, with FIG. 5A presenting an example of a pixel area from which main image signals may be read out in the live view mode and FIG. 5B presenting an example of a pixel area from which correction signals may be read out in the live view mode.

As indicated in FIG. 5A, the control circuit 18 creates main image data in the live view mode as it does in a movie shooting operation, i.e., by using main image signals read out from the pixel photodiodes 141 at pixels selected from all the pixels constituting the image sensor 14, present in pixel rows amounting for ⅓ (500 pixel rows) of the pixel rows set side-by-side along the vertical direction. It is to be noted that the pixel signals may be read out over, for instance, 1/30 sec cycles. The following is a detailed description of the processing.

Prior to the main image signal read, the control circuit 18 reads out correction signals (FPN) to be used for FPN correction value calculation. Assuming that the main image signals are read out from 500 rows, the control circuit 18 executes control so as to output correction signals from the pixel photodiodes 141 present in pixel rows accounting for, for instance, one third of the number of pixel rows from which the main image signals are to be read out by reducing pixel rows along the vertical direction. For these purposes, the control circuit 18 issues an instruction for the timing generator 17 to turn off the corresponding switches 142A and turn on the corresponding switches 142B via the vertical scanning circuit 143 so that correction signals are output from the pixel photodiodes 141 present in 500/3 (166) pixel rows.

Figure 5B:
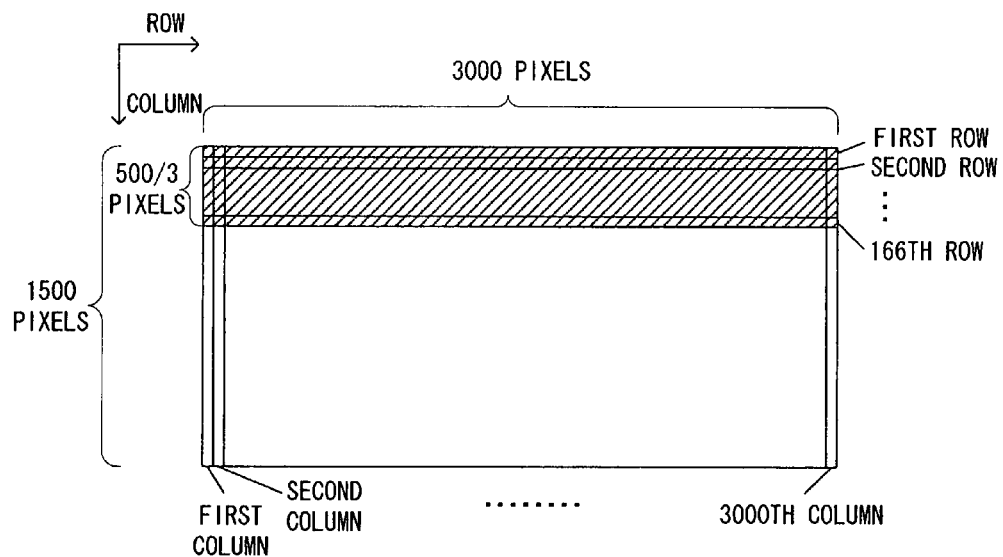

FIG. 5B shows the pixel rows from which correction signals are read out through a reduced read in the live view mode. The pixel rows with the pixels from which correction signals are read out are present in the shaded area. Namely, the vertical scanning circuit 143 turns off the switches 142A and turns on the switches 142B in the first through 166th pixel rows designated as selected rows. It is to be noted that pixel rows present over predetermined intervals (e.g., every third pixel row) may be designated as selected rows. Consequently, correction signals are read out from a total of 166 pixel photodiodes 141 in the first column at the image sensor 14 and the correction signals thus read out are input to the column processing circuit 144. The column processing circuit 144 outputs the correction signals (FPN) originating from all the columns, i.e., from the 3000 columns, to the control circuit 18 via the A/D conversion circuit 16.

The control circuit 18 calculates an FPN correction value in correspondence to each of the 3000 columns by averaging the correction signals from the particular column, among the correction signals from the 3000 columns having been input as described above, and stores the calculated FPN correction values into the temporary memory 183.

When obtaining an image for the first frame, the control circuit 18 issues an instruction for the timing generator 17 to turn on switches 142A and 142B via the vertical scanning circuit 143 so that main image signals are output from the pixel photodiodes 141 present in the 500 pixel rows, as shown in FIG. 5A. Namely, as it does during the movie shooting operation, the vertical scanning circuit 143 sequentially turns on the switches 142A and 142B in, for instance, the second pixel row, the fifth pixel row, . . . and the 3(n−1)th row (n is a natural number: n≤500) designated as the selected rows. Then, as in movie shooting operation, the main image signals are output to the image processing unit 181 in the control circuit 18 and the FPN correction value 1 corresponding to the first column is subtracted from the main image signals from the first column. The image processing unit 181 executes FPN correction processing by subtracting the FPN correction value calculated for each column from the main image signals originating from the corresponding column among the 3000 columns.

When obtaining an image for the second frame, too, the control circuit 18 first reads out correction signals from the 166 pixel photodiodes 141 in correspondence to each column at the image sensor 14 and inputs the correction signals thus read out to the column processing circuit 144. The column processing circuit 144 outputs the correction signals corresponding to all the columns, i.e., the 3000 columns, to the control circuit 18 via the A/D conversion circuit 16.

As it did for the image for the first frame, the control circuit 18 calculates an FPN correction value 2 in correspondence to each of the 3000 columns by averaging the correction signals originating from the particular column. The image processing unit 181 then reads out the FPN correction values 1 stored in the temporary memory 183 and calculates FPN correction values $2_{AVE}$ for the individual columns, each by averaging an FPN correction value 2 having been calculated and the corresponding FPN correction value 1 having been read out. The FPN correction values $2_{AVE}$ thus calculated are stored into the temporary memory 183. Subsequently, as was the case with the image for the first frame, the control circuit 18 reads out the main image signals and the image processing unit executes FPN correction for the main image signals by subtracting the FPN correction value $2_{AVE}$ having been calculated for each column from the main image signals from the corresponding column among the 3000 columns.

The image processing unit 181 calculates FPN correction values as described above as long as images are obtained in the live view mode. Namely, when obtaining an image for the Nth frame, the FPN correction values $(N-1)_{AVE}$ having been calculated when the image for the immediately preceding (N−1)th frame was obtained are read out and an FPN correction value $N_{AVE}$ is calculated in correspondence to each column, as expressed in (1) below.

FPN correction value $N_{AVE}$={FPN correction value $(N-1)_{AVE}$+FPN correction value N}/2    (1)

The image processing unit 181 executes FPN correction processing by subtracting the FPN correction value $N_{AVE}$ thus calculated from the corresponding main image signals. The image processing unit 181 then creates image data by executing the image processing described earlier on the main image signals having undergone the FPN correction processing, and the control circuit 18 brings up on display at the liquid crystal display unit 191 the image corresponding to the image data. It is to be noted that while the correction signals for the Nth frame are being read out, the image for the (N−1)th frame is displayed at the liquid crystal display unit 191 under control executed by the control circuit 18.

—When the Magnification Factor has been Altered—

Figure 6:
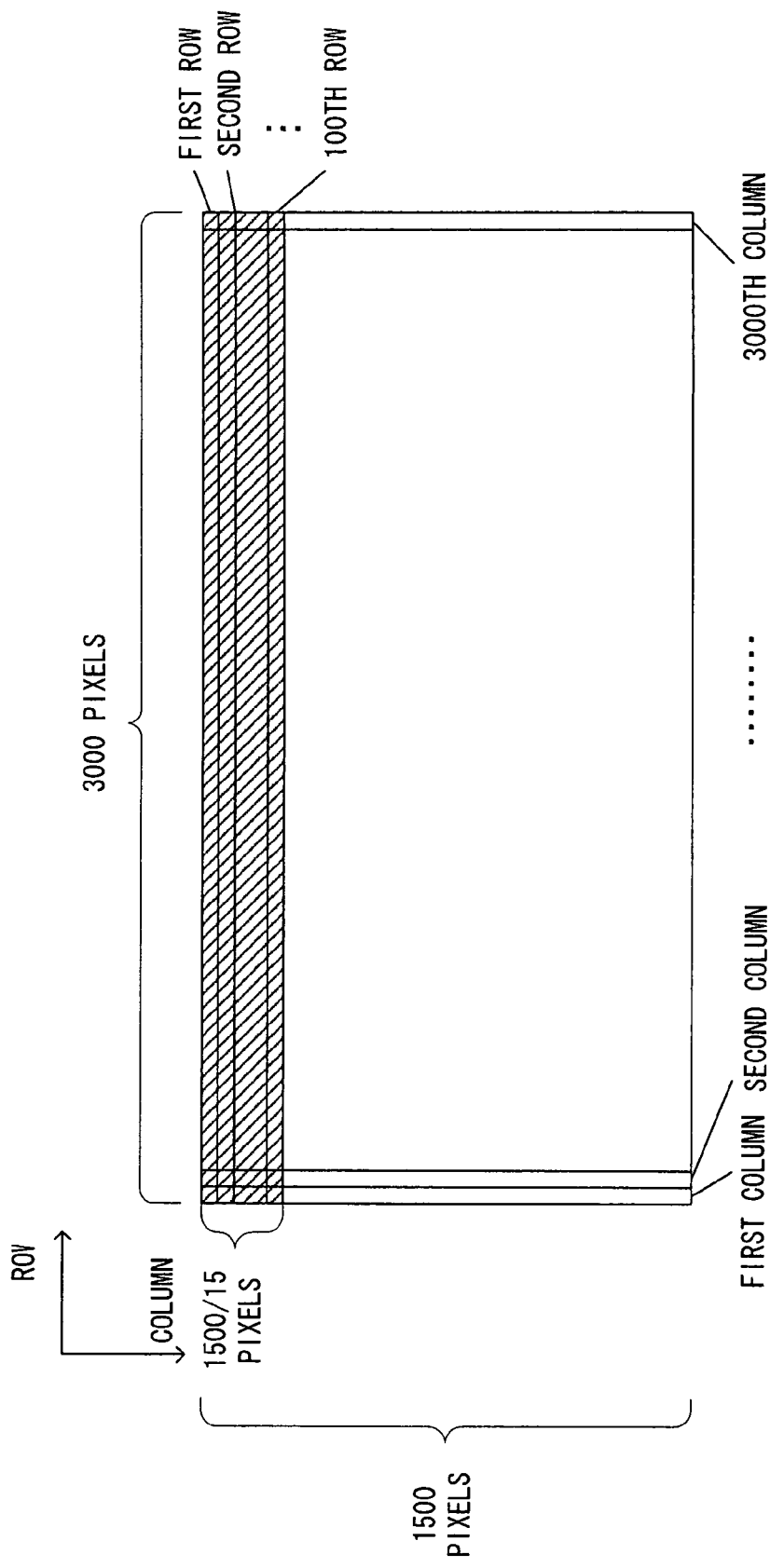
FIG. 6 presents an example of a pixel area from which pixel signals may be read out after the magnification factor is altered in the live view mode.

If the magnification factor has been altered in the live view mode, the control circuit 18 generates main image data by using the pixel signals output from all the pixels constituting the image sensor 14 as main image signals. As indicated in FIG. 6, the control circuit 18 reads out correction signals from the pixel photodiodes 141 present in pixel rows accounting for, for instance, 1500/15 of all the pixel rows i.e., 100 pixel rows, through a reduced read executed before reading out the main image signals. The control circuit 18 issues an instruction for the timing generator 17 to turn off the corresponding switches 142A and turn on the corresponding switches 142B via the vertical scanning circuit 143 so that correction signals are output from the pixel photodiodes 141 in the first through 100th pixel rows. It is to be noted that pixel rows present over predetermined intervals (e.g., every third pixel row) may be designated as selected rows.

The image processing unit 181 calculates FPN correction values by using the correction signals having been read out in much the same way as has been described earlier, and stores the FPN correction values thus calculated into the temporary memory 183. Then, as explained earlier, the image processing unit 181 executes FPN correction by subtracting the FPN correction values from the corresponding main image signals.

Next, the processing executed when shifting from live view image display to still image shooting and the processing executed when shifting from live view image display to movie, shooting are described.

—Shifting from Live View Image Display to Still Image Shooting—

After obtaining the image for the Nth frame in the live view mode described above, the control circuit 18, in response to a shooting instruction signal input as the shutter release switch is pressed all the way down, issues a command for the timing generator 17 to turn on all the switches 142A and 142B. As a result, the pixel signals output from all the pixels at the image sensor 14 are input to the image processing unit 181 as main image signals. The image processing unit 181 reads out the FPN correction values $N_{AVE}$ stored in the temporary memory 183 and subtracts the FPN correction value $N_{AVE}$ having been calculated for each column from the main image signals originating from the corresponding column having been input. Namely, the image processing unit 181 executes FPN correction processing for the main image signals having been input by using the FPN correction values $N_{AVE}$ obtained most recently prior to the start of the shooting operation.

—Shifting from Live View Image Display to Movie Shooting—

After obtaining the image for the Nth frame in the live view mode described above, the control circuit 18, in response to a shooting instruction signal input as the shutter release switch is pressed all the way down, issues a command for main image signal acquisition so as to obtain main image signals to be used to create movie image data for the first frame. Namely, the control circuit 18 issues a command for the timing generator 17 to read out main image signals from the pixel photodiodes 141 present in pixel rows accounting for, for instance, two thirds (1000 rows) of the pixel rows set side-by-side along the vertical direction. The main image signals thus read out are input to the image processing circuit 181.

The image processing unit 181 reads out the FPN correction values $N_{AVE}$ stored in the temporary memory 183 and subtracts the FPN correction value $N_{AVE}$ having been calculated for each column from the main image signals originating from the corresponding column having been input for the first frame. The control circuit 18 then issues a command for main image signal acquisition for the second frame. Pixel signals from the pixel photodiodes 141 present in the pixel rows accounting for two thirds of the pixel rows set side-by-side along the vertical direction were read out as main image signals through a reduced read in much the same way as main image signals are read out for the first frame. The main image signals thus read out are then input to the image processing unit 181. The image processing unit 181 reads out the FPN correction values $N_{AVE}$ stored in the temporary memory 183 and subtracts the FPN correction value $N_{AVE}$ having been calculated for each column from the main image signals originating from the corresponding column having been input for the second frame. Subsequently, the image processing unit 181 executes FPN correction processing for the main image signals for an Mth frame obtained through the movie shooting operation by using the FPN correction values $N_{AVE}$ having been obtained most recently prior to the start of the movie shooting operation.

Figure 7:
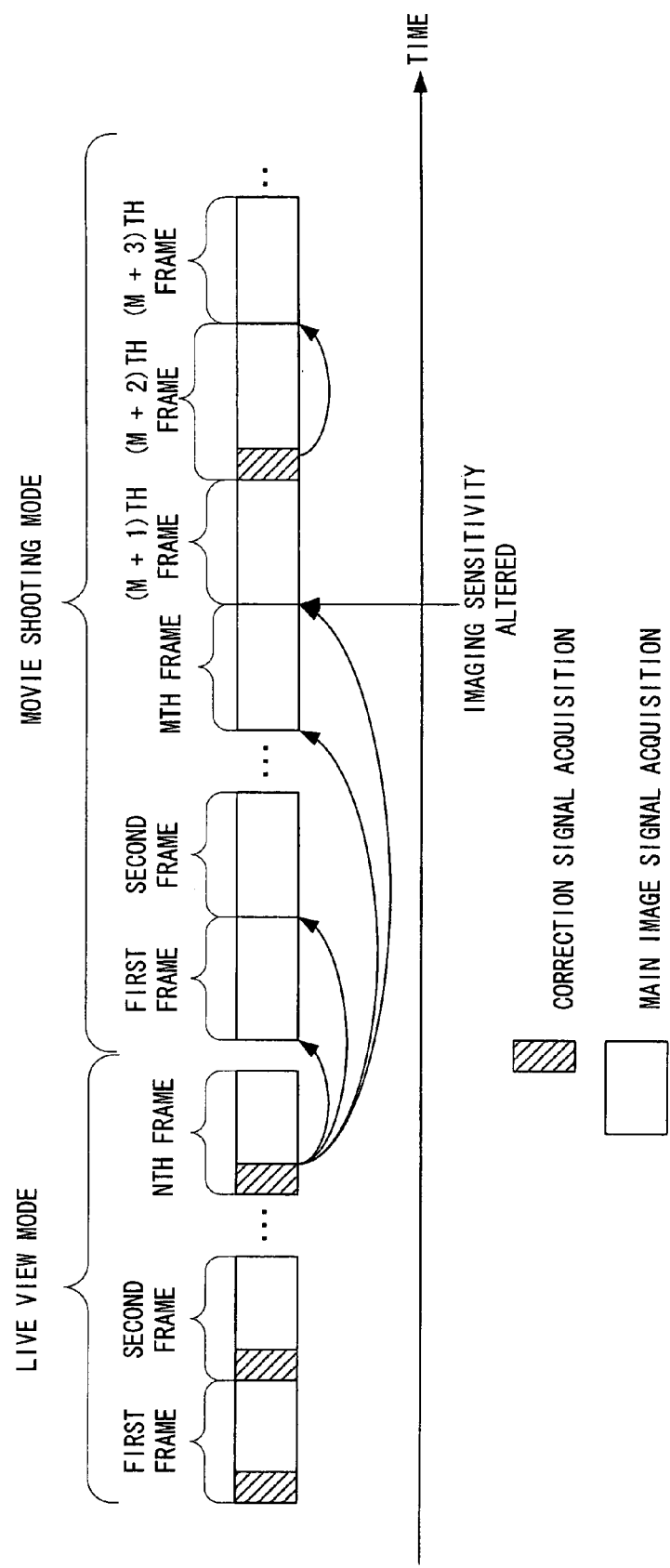
FIG. 7 illustrates the timing with which correction signals are obtained as the imaging sensitivity is adjusted.

The processing executed if the imaging sensitivity is altered while the movie shooting operation, executed as described above, is in progress is now explained in reference to the movie shooting operation timing chart in FIG. 7. It is to be noted that each shaded area in FIG. 7 indicates a time block elapsing over the length of time required for correction signal acquisition. The FPN correction processing is executed for the main image signals for each of the first through Mth frames obtained through the movie shooting operation by using the FPN correction values $N_{AVE}$ having been obtained in the most recent past in the live view mode, as explained earlier. In the example presented in FIG. 7, the imaging sensitivity is altered by the user via the sensitivity setting switch in the operation unit 30 after the main image signals for the Mth frame are obtained during the movie shooting operation. In this situation, the image processing unit 181 executes FPN correction processing for the main image signals for the (M+1)th frame by using the FPM correction values $N_{AVE}$ having been obtained in the most recent past in the live view mode. After obtaining the main image signals for the (M+1)th frame, the control circuit 18 issues a command for correction signal acquisition.

In order to obtain correction signals, the control circuit 18 reads out pixel signals from the pixel photodiodes 141 present in pixel rows accounting for, for instance, 500/6 of the pixel rows (i.e., 83 pixel rows). The control circuit 18 issues an instruction for the timing generator 17 to turn off the corresponding switches 142A and turn on the corresponding switches 142B via the vertical scanning circuit 143 so that correction signals are output from the pixel photodiodes 141 in the first through 83rd pixel rows. It is to be noted that pixel rows present over predetermined intervals (e.g., every third pixel row) may be designated as selected rows. The image processing unit 181 then calculates FPN correction values (M+2) by using the correction signals having been read out in much the same way as that described earlier, and stores the calculated FPN correction values into the temporary memory 183.

The control circuit 18 having obtained the correction signals then obtains main image signals for the (M+2)th frame, as it did for the first through (M+1)th frames. Next, as explained earlier, the image processing unit 181 executes FPN correction by subtracting the FPN correction values (M+2) from the corresponding main image signals for the (M+2)th frame. Subsequently, as long as the imaging sensitivity setting remains unchanged, the image processing unit 181 executes FPN correction processing for the main image signals for the (M+3)th frame and succeeding frames by using the FPN correction values (M+2).

The following advantages are achieved with the camera in the first embodiment described above.

(1) After the camera in the live view mode shifts to movie shooting operation, the image processing unit 181 executes FPN correction processing for the main image signals used to create movie image data by using the FPN correction values $N_{AVE}$ having been obtained in the live view mode. Thus, since new correction signals to be used to calculate FPN correction values do not need to be obtained in correspondence to each frame during the movie shooting operation, the frame rate for the movie shooting operation can be kept up.

(2) After the camera in the live view mode shifts into a movie shooting operation, the image processing unit 181 executes FPN correction processing for the main image signals by using the same FPN correction values $N_{AVE}$ as those obtained in the most recent past in the live view mode. These FPN correction values $N_{AVE}$ have each been calculated in the live view mode by averaging the FPN correction value N having been calculated for a specific column based upon the correction signals corresponding to the Nth frame and the corresponding FPN correction value $(N-1)_{AVE}$ having been calculated based upon the correction signals for the immediately preceding frame, i.e., the (N−1)th frame. This means that since the FPN correction values $N_{AVE}$ used for the FPN correction reflect any fluctuation in the characteristics of the internal circuit constituting the column processing circuit 144 attributable to factors such as the temperature, a high-quality movie image can be obtained through accurate FPN correction.

(3) If the imaging sensitivity setting at the image sensor 14 is altered while movie shooting is in progress, the control circuit 18 issues an instruction for new correction signal acquisition and the image processing unit 181 calculates FPN correction values based upon the newly acquired correction signals. The image processing unit 181 then executes FPN correction for the main image signals by using the FPN correction values thus calculated. Under normal circumstances, if the imaging sensitivity is doubled, the FPN corresponding to each pixel, too, will be doubled. Since different FPN correction values are calculated in correspondence to the change in the imaging sensitivity setting, a high-quality movie image, having undergone very accurate FPN correction, can be obtained through the embodiment.

(4) Until the imaging sensitivity setting is altered again, the image processing unit 181 executes FPN correction processing for the main image signals used to create movie image data for subsequent frames by using the same FPN correction values as those calculated following the initial change in the imaging sensitivity setting at the image sensor 14. Thus, since new correction signals to be used to calculate FPN correction values do not need to be obtained in correspondence to each frame during the movie shooting operation, the frame rate for the movie shooting operation can be kept up.

Second Embodiment

Figure 8:
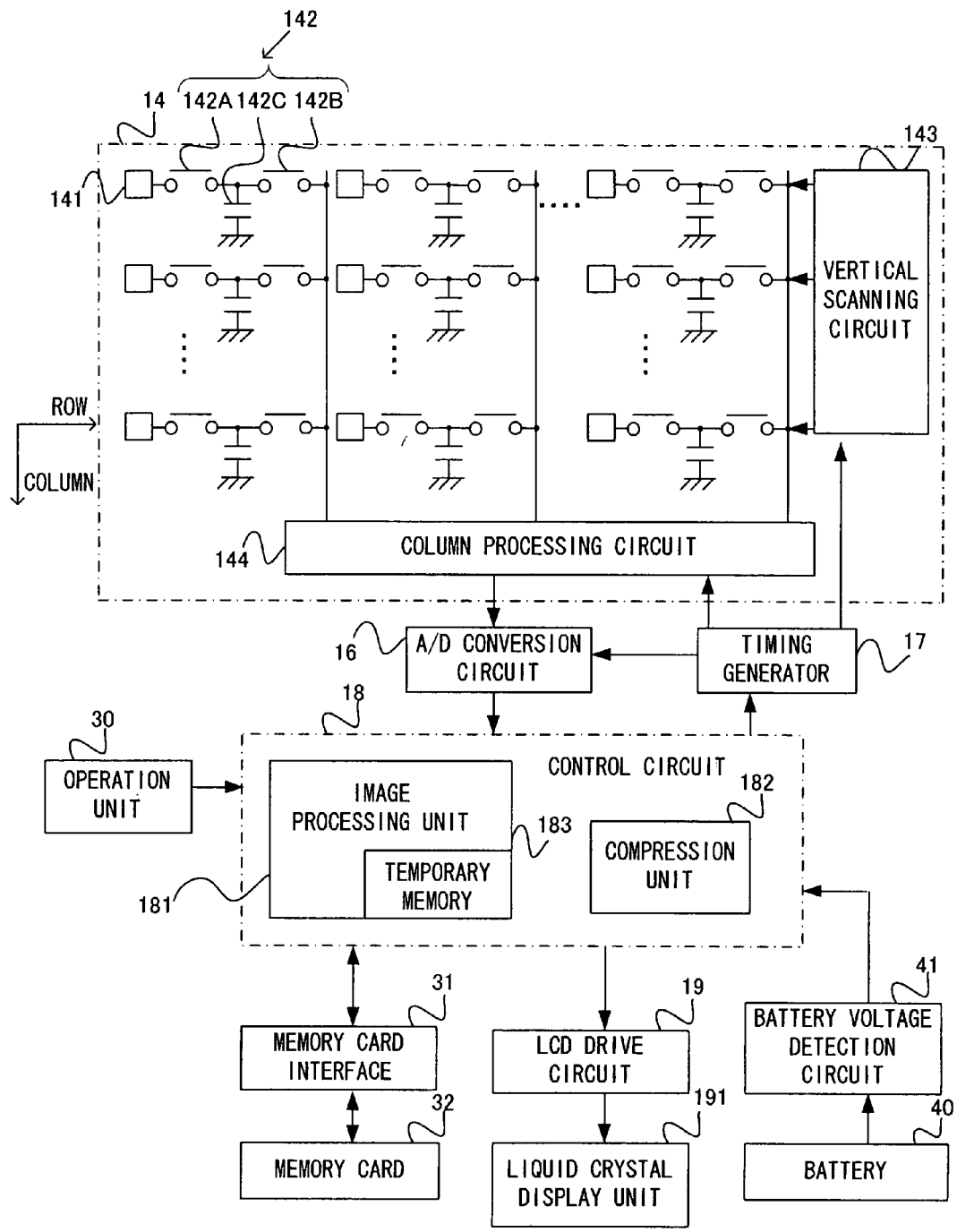
FIG. 8 is a block diagram showing the structure of the control system in the electronic camera achieved in a second embodiment.
Figure 9:
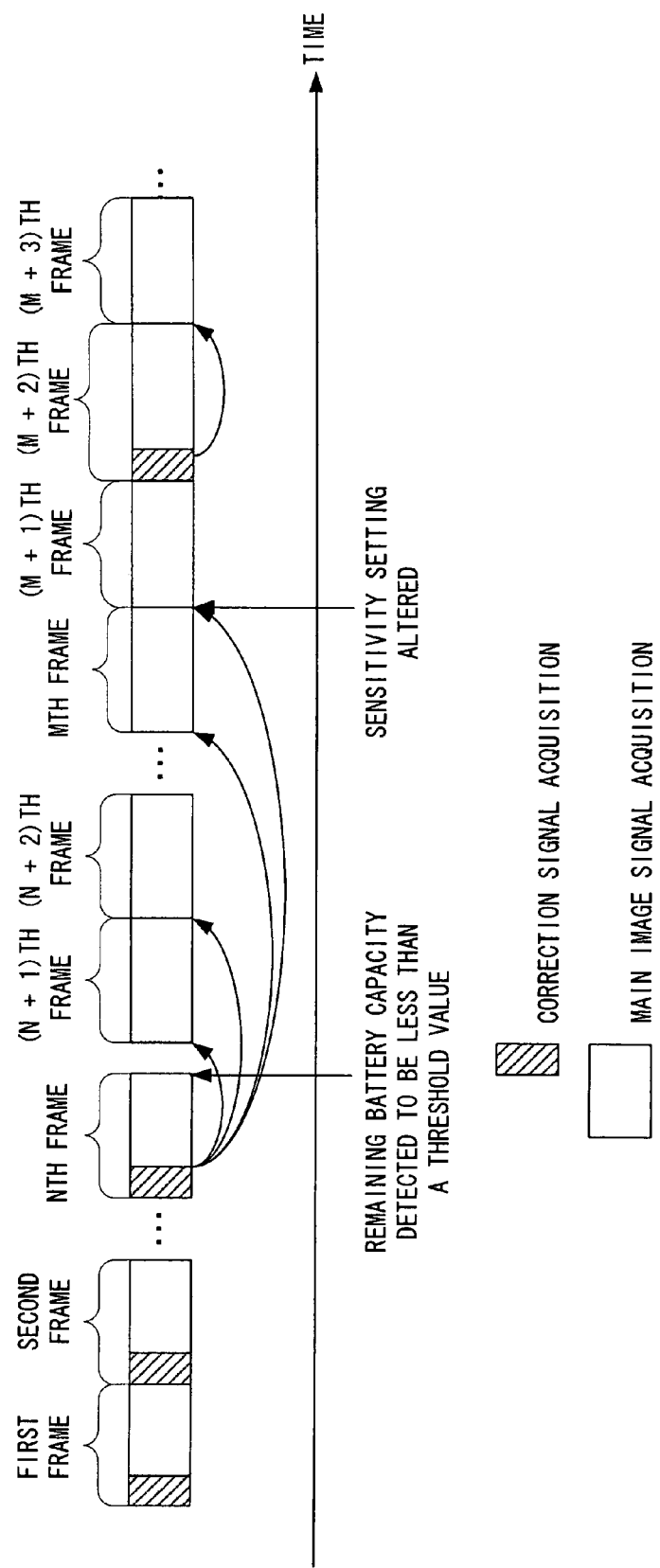
FIG. 9 illustrates the timing with which correction signals are obtained.

In reference to FIGS. 8 and 9, the camera achieved in the second embodiment of the present invention is described. The following explanation focuses on features distinguishing the second embodiment from the first embodiment by assigning the same reference numerals to components identical to those in the first embodiment. Aspects of the second embodiment that are not specially noted are identical to those in the first embodiment. In addition, the description is given in reference to FIG. 9 by assuming that the pixel rows extend along the horizontal direction in the figure and that the pixel columns extend along the vertical direction in the figure, as in the first embodiment. The embodiment is distinguishable from the first embodiment in that, once the remaining battery capacity becomes equal to or lower than a predetermined value during live view image display, a correction signal read is prohibited and FPN correction is executed for the main image signals by using the FPN correction values $N_{AVE}$ already in use.

As shown in FIG. 8, the electronic camera 1 includes a battery 40 from which power is supplied to various units and a battery voltage detection circuit 41. The battery voltage detection circuit 41 constantly measures the available power remaining in the battery 40. A remaining power signal indicating the measurement results is output to the control circuit 18 via an A/D conversion circuit (not shown). Based upon the remaining power signal input thereto, the control circuit 18 compares the level of power remaining in the battery 40 with a preset threshold value (e.g., 50% of the full capacity). Upon detecting that the remaining capacity of the battery 40 is equal to or greater than the threshold value in the live view mode, the control circuit 18 designates pixel rows with pixels from which main image signals and correction signals are to be read out as selected pixel rows, as in the first embodiment. Namely, the control circuit 18 executes control so as to read out main image signals through a reduced read from the pixel photodiodes 141 in pixel rows accounting for one third (500 rows) among the pixel rows set side-by-side along the vertical direction, instead of reading out the main image signals from all the pixels constituting the image sensor 14. The control circuit 18 further designates pixel rows accounting for 500/3 (166 pixel rows) as selected pixel rows and reads out correction signals from the pixel photodiodes 141 present in the selected rows, among the pixel photodiodes in all the pixels constituting the image sensor 14. Subsequently, the image processing unit 181 executes FPN correction processing for the main image signals by using FPN correction values calculated as has been described in reference to the first embodiment.

If the control circuit 18, having obtained the image for the Nth frame, detects that the remaining capacity of the battery 40 is less than the threshold value, i.e. less than 50% of the full capacity power, after obtaining an image for the Nth frame, the control circuit 18 executes FPN correction processing for images in the (N+1)th frame and subsequent frames with the FPN correction values $N_{AVE}$ that are already in use, by prohibiting acquisition of correction signals for the (N+1)th frame and subsequent frames. Namely, the control circuit 18 issues a command for the timing generator 17 so as to read out the main image signals only. As indicated in the timing chart presented in FIG. 9, the image processing unit 181 executes FPN correction processing for the main image signals for the (N+1)th frame and subsequent frames by reading out the FPN correction values $N_{AVE}$ stored in the temporary memory 183 and subtracting the FPN correction value $N_{AVE}$ having been calculated for each column from the main image signals from the corresponding column input as main image signals for each of the (N+1)th frame and subsequent frames.

The processing executed after the imaging sensitivity setting is altered while the remaining capacity in the battery 40 is detected to be less than the threshold value is now described. In the example presented in FIG. 9; the imaging sensitivity setting is altered via the sensitivity setting switch in the operation unit 30 after obtaining the main image signals for the Mth frame. In this situation, the image processing unit 181 executes FPN correction processing for the main image signals for the (M+1)th frame by using the FPN correction values $N_{AVE}$ stored in the temporary memory 183. After the main image signals for the (M+1)th frame are obtained, the control circuit 18 issues a command for the timing generator 17 so as to read out correction signals. In other words, the control circuit 18 temporarily clears the prohibition of the correction signal read.

The control circuit 18 reads out pixel signals, to be used as correction signals, from the pixel photodiodes 141 present in the pixel rows accounting for 500/3 (166 pixel rows) of the pixel rows as has been described earlier. Once the correction signals are read out, the image processing unit 181 calculates FPN correction values (M+2) in much the same way as that explained earlier, and stores the FPN correction values (M+2) thus calculated into the temporary memory 183. The control circuit 18, having obtained the correction signals, then obtains the main image signals for the (M+2)th frame. The image processing unit 181 executes FPN correction processing by subtracting the FPN correction values (M+2) from the main image signals for the (M+2)th frame, as has been described above. Subsequently, as long as the imaging sensitivity setting remains unchanged, the image processing unit 181 executes FPN correction processing for the main image signals for the (M+3)th frame and succeeding frames by using the FPN correction values (M+2).

It is to be noted that if the control circuit 18 detects the remaining capacity in the battery 40 to be less than the threshold value, i.e., 50% of the full capacity power as the live view mode is selected, the control circuit 18 will calculate FPN correction values 1 in correspondence to the first frame and FPN correction processing will be executed for the main image signals for the second frame and subsequent frames with the FPN correction values 1.

The following advantages are achieved with the electronic camera in the second embodiment described above.

(1) Upon detecting that the available power remaining in the battery 40 is less than the threshold value in the camera set in the live view mode, the control circuit 18 prohibits acquisition of correction signals to be used for purposes of FPN correction value calculation. In other words, the control circuit 18 executes FPN correction processing by using the FPN correction values already in use. As a result, when the battery capacity runs low in the battery 40, the length of time over which the image sensor 14 is driven is reduced, thereby contributing to better power efficiency.

(2) Once the correction signal acquisition is prohibited, the image processing unit 181 executes FPN correction processing for the main image signals by using the same FPN correction values $N_{AVE}$ as those calculated prior to correction signal acquisition. These FPN correction values $N_{AVE}$ have each been calculated by averaging an FPN correction value N calculated based upon correction signals for the Nth frame and the corresponding FPN correction value $(N-1)_{AvE}$ calculated based upon correction signals for the immediately preceding (N−1)th frame in the live view mode. This means that since the FPN correction values $N_{AVE}$ used for the FPN correction reflect any fluctuation in the characteristics of the internal circuit constituting the column processing circuit 144 attributable to factors such as the temperature, a high-quality image can be obtained through accurate FPN correction.

(3) If the imaging sensitivity setting at the image sensor 14 is altered while the live view display is up in the live view mode, the control circuit 18 issues an instruction for new correction signal acquisition by temporarily clearing the prohibition of the correction signal read. The image processing unit 181 then calculates FPN correction values based upon the newly acquired correction signals and executes FPM correction processing for the main image signals with the FPN correction values thus calculated. Under normal circumstances, if the imaging sensitivity is doubled, the FPN corresponding to each pixel, too, will be doubled. Since different FPN correction values are calculated in correspondence to the change in the imaging sensitivity setting, a high-quality image, having undergone very accurate FPN correction, can be obtained through the embodiment.

(4) Until the imaging sensitivity setting is altered again, the image processing unit 181 executes FPN correction processing for the main image signals obtained in correspondence to subsequent frames by using the same FPN correction values as those calculated following the initial change in the imaging sensitivity setting at the image sensor 14. Thus, since new correction signals to be used to calculate FPN correction values do not need to be obtained in correspondence to each frame in the live view mode, the extent to which battery capacity at the battery 40 is consumed can be minimized.

Third Embodiment

Figure 10:
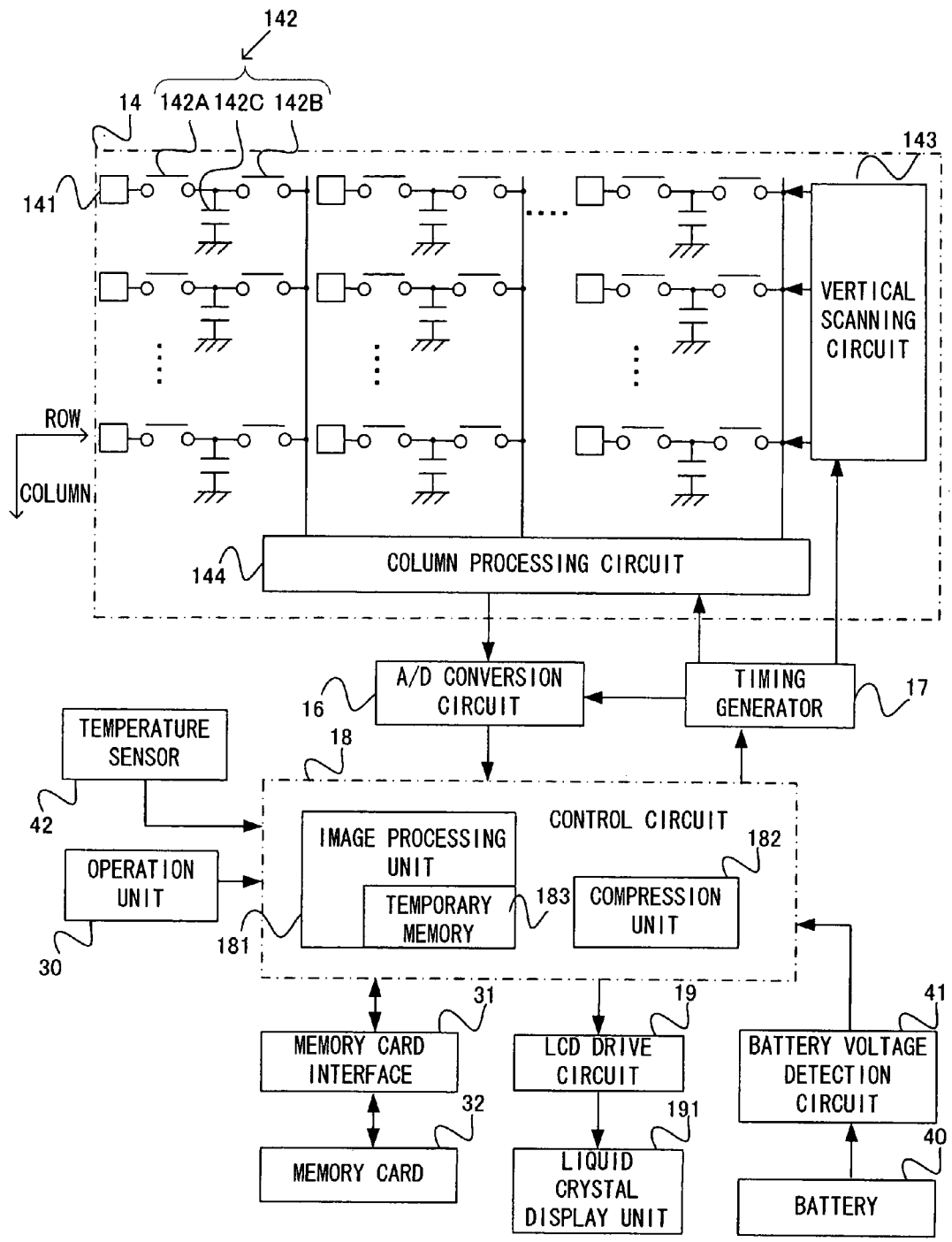
FIG. 10 is a block diagram showing the structure of the control system in the electronic camera achieved in a third embodiment.

In reference to FIG. 10, the camera achieved in the third embodiment of the present invention is described. The following explanation focuses on features distinguishing the third embodiment from the first or second embodiment by assigning the same reference numerals to components identical to those in the first or second embodiment. Aspects of the third embodiment that are not specially noted are identical to those in the first or second embodiment. In addition, the description is given in reference to FIG. 4 by assuming that the pixel rows extend along the horizontal direction in the figure and that the pixel columns extend along the vertical direction in the figure, as in the first and second embodiments. The embodiment is distinguishable from the first and second embodiments in that, once the temperature near the image sensor 14 becomes equal to or greater than a predetermined value during live view image display, a correction signal read is prohibited and FPN correction is executed for the main image processing by using the FPN correction values $N_{AVE}$ already in use.

As shown in FIG. 10, the electronic camera 1 includes a temperature sensor 42. The temperature sensor 42 constantly measures the temperature around the image sensor 14 and outputs a temperature signal indicating the measurement results to the control circuit 18 via an A/D conversion circuit (not shown). Based upon the temperature signal input thereto, the control circuit 18 compares the temperature near the image sensor 14 having been measured by the temperature sensor 42 with a preset threshold value (e.g., 45° C.). It is to be noted that a value determined depending upon the rating of the image sensor 14, is used as the threshold value. In addition, it is assumed that the threshold value set for a camera that has a function of exiting the live view mode whenever the temperature near the image sensor 14 becomes equal to or greater than a predetermined value, is less than the predetermined value.

Upon detecting that the temperature near the image sensor 14 having been measured by the temperature sensor 42 is less than the threshold value (45° C.) in the live view mode, the control circuit 18 determines pixel rows to be selected for the main image signal read and the correction signal read. Namely, the control circuit 18 executes control so as to read out main image signals from the pixel photodiodes 141 in pixel rows accounting for one third (500 rows) among adjacent pixel rows along the vertical direction, instead of reading out main image signals from all the pixels constituting the image sensor 14. The control circuit 18 further designates pixel rows accounting for 500/3 (166 pixel rows) and reads out correction signals from the pixel photodiodes 141 present in the selected rows, among the pixel photodiodes 141 in all the pixels constituting the image sensor 14. Subsequently, the image processing unit 181 executes FPN correction processing for the main image signals by using FPN correction values calculated as described in reference to the first embodiment.

In the live view mode, the control circuit 18 having obtained the main image signals for the Nth frame detects that the temperature near the image sensor 14 measured by the temperature sensor 42 is equal to or above the threshold value (45° C.), the control circuit 18 executes FPN correction processing for images in the (N+1)th frame and subsequent frames with the FPN correction values $N_{AVE}$ that are already in use, by prohibiting acquisition of correction signals for the (N+1)th frame and subsequent frames. Namely, the control circuit 18 issues a command for the timing generator 17 so as to read out the main image signals only. The image processing unit 181 executes FPN correction processing for the main image signals for the (N+1)th frame and subsequent frames by using the FPN correction values $N_{AVE}$ stored in the temporary memory 183. If the imaging sensitivity setting is altered, the control circuit 18 temporarily clears the prohibition of the correction signal read as has been explained in reference to the second embodiment.

It is to be noted that if the control circuit 18 detects that the temperature near the image sensor 14 is equal to or higher than the threshold value (45° C.) as the live view mode is selected, the control circuit 18 will calculate FPN correction values 1 in correspondence to the first frame and FPN correction processing will be executed for the main image signals for the second frame and subsequent frames with the FPN correction values 1.

In addition to advantages (2) to (4) of the second embodiment, the following advantage is achieved with the electronic camera 1 in the third embodiment described above.

(1) Upon detecting via the temperature sensor 42 that the temperature near the image sensor 14 is equal to or above the threshold value in the camera set in the live view mode, the control circuit 18 prohibits acquisition of correction signals to be used for purposes of FPN correction value calculation. In other words, the control circuit 18 executes FPN correction processing by using the FPN correction values already in use. As a result, since the occurrence of noise attributable to a quiescent current or the like in the image displayed in the live view mode is minimized by reducing the length of time over which the image sensor 14 is driven and thus preventing the temperature at the image sensor 14 from rising, the quality of the image on display can be effectively maintained.

The cameras achieved in the embodiments described above allow for the following variations.

Figure 11A:
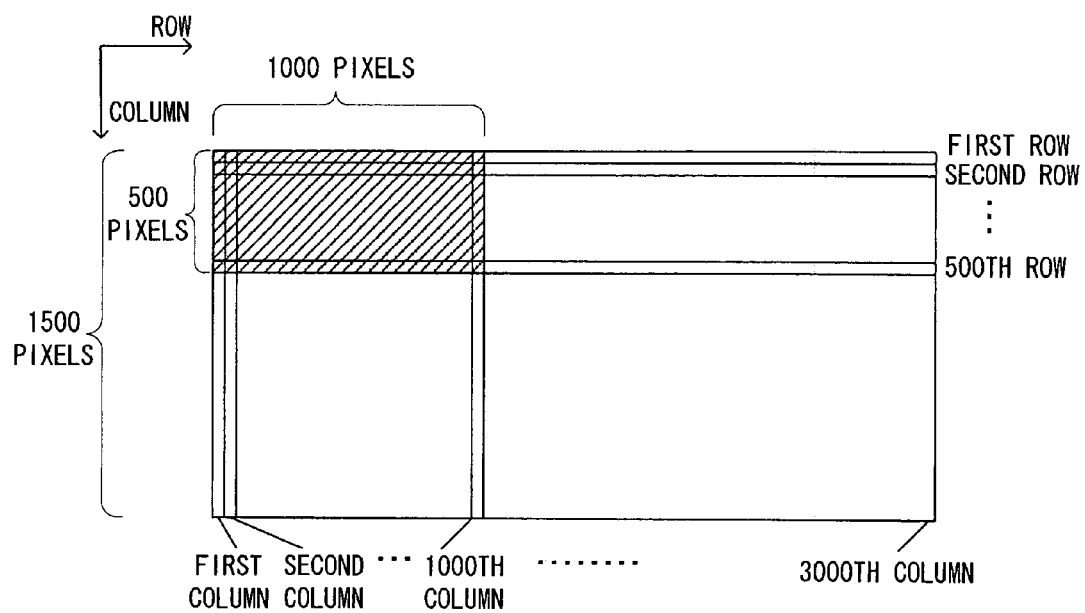
FIGS. 11A and 11B each show a pixel area from which pixel signals may be read out in a variation, with FIG. 11A presenting an example of a pixel area from which main image signals may be read out and FIG. 11B presenting an example of a pixel area from which correction signals may be read out.
Figure 11B:
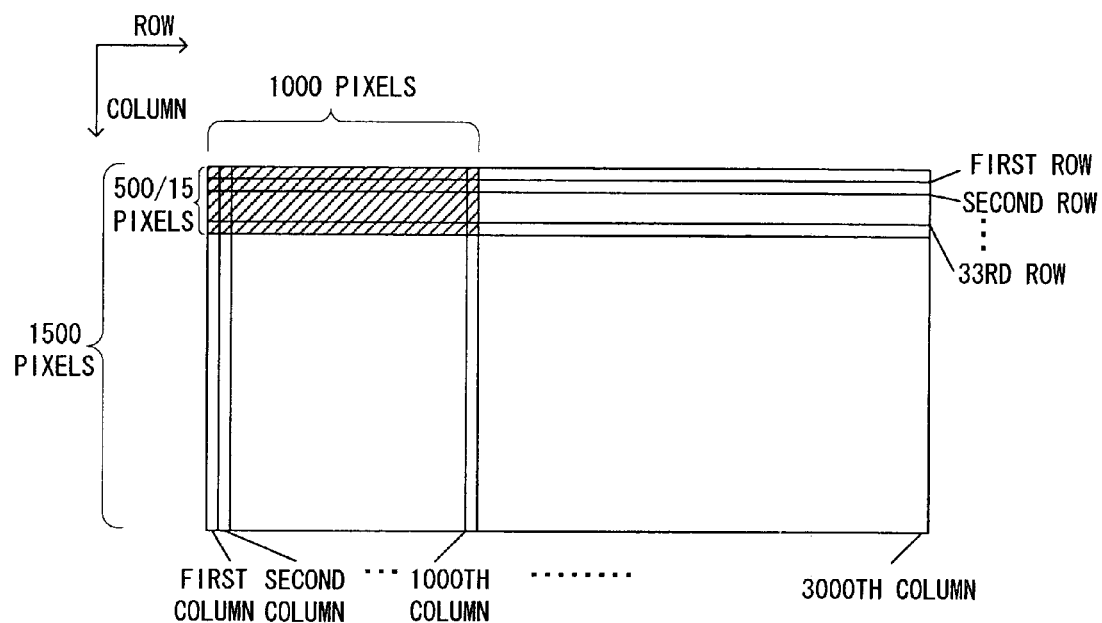

(1) When the magnification factor is altered in the live view mode, main image signals and correction signals may be read out from pixel photodiodes 141 disposed in an area corresponding to the magnified area on the image, instead of switching to different pixel rows for the main image signal read and the correction signal read. FIGS. 11A and 11B present examples of pixels from which the main image signals and the correction signals may be read out in this variation. Namely, the control circuit 18 may read out the pixel signals from the 500×1000 pixels in the shaded area in FIG. 11A as main image signals. The control circuit 18 may further designate 500/15 pixel rows (33 pixel rows) in the shaded area in FIG. 11B as selected pixel rows and reads out pixel signals from the 33×1000 pixels in the shaded area as correction signals.

(2) The control circuit 18 in an electronic camera 1 that includes both the battery 40 and the temperature sensor 42 may prohibit correction signal acquisition either if the temperature near the image sensor 14 detected via the temperature sensor 42 is equal to or above the threshold value or if the available power remaining in the battery 40 is less than the threshold value.

(3) The present invention may be adopted in an electronic camera 1 equipped with a fixed, permanent photographic lens instead of an interchangeable lens.

(4) In the second embodiment described above, the FPN correction data having been obtained in the live view mode are utilized for subsequent FPN correction if the remaining capacity of the battery becomes low in the live view mode. However, the present invention is not limited to this example and the method described in reference to the second embodiment may be adopted in applications other than the live view mode application, as long as pixel signals are continuously output from the image sensor (as long as the image sensor is in a continuous imaging state). The image sensor in the continuous imaging state, in which imaging operation is continuously repeated may be engaged in, for instance, continuous shooting operation through which still images are continuously shot. The method described in reference to the second embodiment may be adopted in such a continuous shooting mode as well. An application example is described below by assuming that the method is adopted in conjunction with a continuous shooting mode in which 15 consecutive frames of still images are shot. In this situation, if the remaining capacity of the battery becomes lower than a predetermined reference remaining power level as continuous shooting operation has progressed to capture, for instance, the image for the ninth frame, the image processing unit 181 will utilize the FPN correction data obtained while capturing the image for the ninth frame when executing FPN correction for the images for the 10th frame and subsequent frames (10th through 15th frames).

The same concept applies to the method achieved in the third embodiment. Namely the method described in reference to the third embodiment may also be adopted when the temperature at the image sensor rises while continuously shooting still images. In this case, the image processing unit 181 will execute FPN correction processing for the images for subsequent continuously-shot frames after the temperature at the image sensor exceeds a predetermined reference temperature by utilizing the FPN correction data obtained during the shooting operation completed immediately before the temperature exceeds the reference temperature.

Furthermore, the first embodiment described earlier may be adopted in conjunction with the still image continuous shooting mode. Namely, if a movie recording start operation is performed while still image continuous shooting operation is in progress, the image processing unit 181 will utilize the FPN correction data obtained in correspondence to the last frame captured through the still image continuous shooting operation when executing FPN correction processing for images captured through the movie shooting operation.

The above described embodiments are examples, and various modifications can be made without departing from the scope of the invention.

What is claimed is:

1. An imaging device comprising:
an image capturing unit including an image sensor, in which a plurality of pixels are arranged that outputs a first pixel signal which is used for noise removal and a second pixel signal generated by an electrical charge resulting from photoelectric conversion, both of the first and second pixel signals being generated while subject light is received by the image sensor;
a calculation unit that calculates correction values for correcting the second pixel signal, based on the first pixel signal;
a correction unit that corrects the second pixel signal by using the correction values calculated by the calculation unit; and
a control unit that controls the image capturing unit to assume one of a first output mode and a second output mode, the first output mode alternately outputting the first pixel signal and the second pixel signal from the plurality of pixels, the second output mode outputting the second pixel signal only from the plurality of pixels, wherein:
if the control unit controls the image capturing unit to change from the first output mode to the second output mode, the correction unit corrects the second pixel signal of the second output mode by using the correction values calculated by the calculation unit when the image capturing unit assumed the first output mode.

2. The imaging device according to claim 1, wherein:
after the control unit controls the image capturing unit to change from the first output mode to the second output mode, the correction unit corrects the second pixel signal of the second output mode by using correction values most recently calculated from among correction values calculated by the calculation unit in the first output mode.

3. The imaging device according to claim 1, further comprising:
a capacity detection unit that detects a change in remaining power in a battery to a level less than a predetermined threshold value, wherein:
the control unit controls the image capturing unit to change from the first output mode to the second output mode when the capacity detection unit detects the change in the remaining capacity of the battery to the level less than the predetermined threshold value.

4. The imaging device according to claim 1, further comprising:
a temperature detection unit that detects a change in a temperature near the image sensor to a level equal to or above a predetermined threshold value, wherein:
the control unit controls the image capturing unit to change from the first output mode to the second output mode when the temperature detection unit detects the change in the temperature to the level equal to or above the predetermined threshold value.

5. The imaging device according to claim 1, further comprising:
a display unit at which an image corresponding to the second pixel signal corrected by the correction unit is displayed.

6. The imaging device according to claim 1, further comprising:
an instruction member that issues an instruction for the control unit to control the image capturing unit to change from the first output mode to the second output mode when the instruction member is operated.

7. The imaging device according to claim 1, further comprising:
a sensitivity setting member that sets an imaging sensitivity level at the image sensor, wherein:
if the imaging sensitivity level is altered in the second output mode, the control unit controls the image capturing unit to output the first pixel signal, the calculation, unit calculates new correction values based on the first pixel signal output by the image capturing unit after the imaging sensitivity is altered; and
the correction unit corrects the second pixel signal by using the new correction values calculated by the calculation unit after the imaging sensitivity is altered.

8. An imaging device comprising:
an image capturing unit including an image sensor, in which a plurality of pixels are arranged, each of the plurality of pixels including a pixel photodiode, the image capturing unit capturing a subject image during a state of exposure and outputting a first pixel signal and a second pixel signal, the first pixel signal being output by the image capturing unit during the state of exposure with the pixel photodiode disconnected while subject light is received by the image sensor, the second pixel signal being output by the image capturing unit during the state of exposure with the pixel photodiode connected while the subject light is received by the image sensor;
a calculation unit that calculates correction values for correcting the second pixel signal, based on the first pixel signal;
a correction unit that corrects the second pixel signal by using the correction values calculated by the calculation unit; and
a control unit that controls the image capturing unit to assume one of a first output mode and a second output mode, the first output mode alternately outputting the first pixel signal and the second pixel signal from the plurality of pixels, the second output mode outputting the second pixel signal only from the plurality of pixels, wherein:
if the control unit controls the image capturing unit to change from the first output mode to the second output mode, the correction unit corrects the second pixel signal of the second output mode by using the correction values calculated by the calculation unit when the image capturing unit assumed the first output mode.

* * * * *